Aug. 26, 1924.  1,506,453
C. W. SHAIFER
SEGREGATED DRIVE FOR PAPER MACHINES AND THE LIKE
Original Filed Feb. 28, 1921
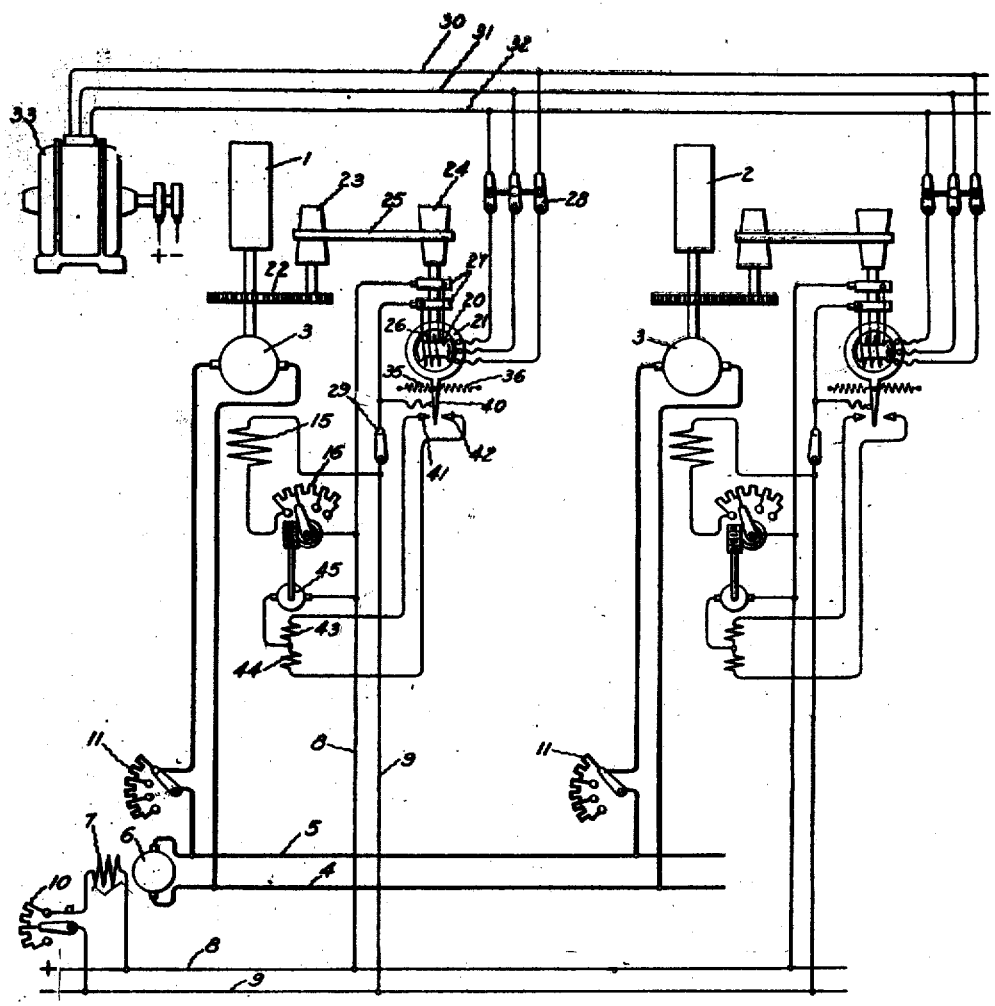
Inventor:
Charles W. Shaifer,
by Albert G. Davis
His Attorney.

Patented Aug. 26, 1924.

1,506,453

UNITED STATES PATENT OFFICE.

CHARLES W. SHAIFER, OF SCHENECTADY, NEW YORK, ASSIGNOR TO GENERAL ELECTRIC COMPANY, A CORPORATION OF NEW YORK.

SEGREGATED DRIVE FOR PAPER MACHINES AND THE LIKE.

Application filed February 28, 1921, Serial No. 448,545. Renewed April 19, 1924.

*To all whom it may concern:*

Be it known that I, CHARLES W. SHAIFER, a citizen of the United States, residing at Schenectady, county of Schenectady, State of New York, have invented certain new and useful Improvements in Segregated Drives for Paper Machines and the like, of which the following is a specification.

My invention relates to segregated drives for paper machines and the like in which a plurality of driven elements are normally required to operate in fixed speed relation and in which it is essential that the speed of any individual element of the machine, as well as of the machine as a whole, be readily adjustable. In segregated drives for paper machines or the like, it is absolutely necessary, for a successful operation of the machine, that each element of the machine be so arranged that the speed thereof may be varied to adjust the speed relation between the various elements and that after the speed of each element has been properly adjusted the speed relationship of the various elements be maintained fixed regardless of changes in load or other conditions which tend to disturb the speed at which the driving motor of any individual element tends to run.

An object of my invention is to provide a form of drive for regulating and adjusting the speed relationship of the elements of the machine which will be simple to construct and operate, which will render the use of complicated mechanical gearing unecessary, and which will involve the transmission of but a negligible amount of power for regulating purposes.

My invention will be better understood from the following description, taken in connection with the accompanying drawing, and its scope will be pointed out in the appended claims.

Referring to the accompanying drawing which is a diagram illustrating one embodiment of my invention, 1 and 2 represent two elements of the machine to be controlled. Each element is driven by a motor 3, which, in this case, is represented as a direct current motor connected to the mains 4 and 5 supplied with current from the generator 6. The generator is provided with a field winding 7 supplied from the excitation mains 8 and 9 and an adjustable resistance 10 is provided in the circuit of the generator field winding 7 to adjust the voltage of the generator. A starting resistance 11 is provided in the armature circuit of each motor 3. Each motor is provided with a field winding 15. One terminal of each field winding 15 is connected to the excitation main 9 and the other terminal of each field winding 15 is connected through an adjustable resistance 16 to the excitation main 8.

In order to maintain an absolutely fixed speed relationship between the various elements of the machine, I provide for each element a relatively small dynamo electric machine constructed as a cradle dynamometer and comprising a rotor 20 and a stator 21. These machines must be of the synchronously running type, that is to say, they must be so constructed that the speed of rotation tends to maintain a fixed relationship to the frequency of the alternating current supplied to the machine. In the drawing these machines are represented as synchronous machines in which one member is provided with direct current excitation. Each rotor 20 is represented as being driven by the corresponding driving motor 3 by means of the cone pulleys 23 and 24 through gearing 22 whereby the speed of the rotor is greater than the speed of the corresponding motor. An adjustable belt 25 is arranged upon each pair of cone pulleys to provide for adjusting the speed of each individual element of the machine with respect to the speeds of the remaining elements. It will be apparent, however, that my invention is not limited to any particular form of speed adjusting means. The rotor 20 of each synchronous machine is represented as being provided with a direct current winding 26, which is connected through slip rings 27 to the excitation mains 8 and 9 and which is arranged to provide the rotor with magnetic poles of a fixed polarity. A switch 29 is provided for controlling the connection between the excitation mains 8 and 9 and the winding 26. The stator of each synchronous machine is provided with an alternating winding which is arranged to be connected by means of a switch 28 to the alternating current mains 30, 31 and 32 which are supplied with alternating current of a predetermined frequency from the synchronous alternator 33 which may be driven at constant speed by any suitable driving means. The speed of this driving means should be adjustable in order to enable the frequency of the alternating current delivered by the machine 33 to be varied. The stator 21 of each synchronous machine is mounted in any well known manner so as to be rotatable independently of the rotor 20 in either direction around the rotor. Suitable means are provided to hold the stator 21 in a predetermined normal position. In the drawing this means is illustrated as consisting of a pair of springs 35 and 36 which bias the stator to a position where a contact 40 mounted on the stator lies between a pair of stationary contacts 41 and 42. As thus arranged the small synchronous machine constitutes a contact-making dynamometer and is arranged to control automatically the speed of the corresponding driving motor by adjusting the resistance in the motor field circuit in any suitable manner. It is to be understood, however, that my invention is not limited to any particular means of utilizing the movement of the stator of the synchronous machine to adjust the motor field resistance.

In the specific embodiment of my invention disclosed in the drawing, the contacts 41 and 42 are connected respectively to the field windings 43 and 44 of a pilot motor 45, which is arranged to vary the amount of resistance 16 in the circuit of the field winding 15. The contact 40 on the stator 21 is connected to the excitation main 9 and when the contact engages one of the contacts 41 or 42 a circuit is completed from the main 9 through the contact 40, one of the pilot motor field windings 43 or 44 and pilot motor armature 45 to the other excitation main 8. The field windings 43 and 44 are arranged and connected to produce opposite magnetization in the field structure of the motor so that this motor runs in one direction or the other to increase or decrease the resistance 16 in the circuit of the field winding 15 according to whether the circuit is completed at contact 41 or contact 42. With the machine elements arranged for a direction of rotation corresponding to the arrows on rotors 20, the pilot motors will be arranged to cut out resistance and correct any tendency of the main driving motors to decrease in speed when contacts 40 and 41 are in engagement, and to cut in resistance and correct any tendency of said motors to increase in speed when the contacts 40 and 42 are in engagement. It is obvious that my invention is not limited to any particular connections for the pilot motor, since pilot motors controlled by contact-making instruments are well known in the art.

In order to simplify the description of the operation of the embodiment of my invention shown in the drawing, I will first describe the normal operation of the apparatus and then describe how the machine may be started from rest. With any given frequency on the mains 30, 31 and 32, the speed and direction of rotation of the magnetic fields induced in the distributed windings on stators 21 will be the same as the speed and direction of rotation of the rotors 20 which are driven from the various machine elements. By virtue of the well known properties of synchronous dynamo electric machines the magnetic poles of the rotor will tend to remain in a fixed space relationship with the magnetic poles of the stator. Since all of the stator windings are supplied with current of the same frequency the magnetic fields induced by the various stator windings will all rotate with the same speed, and according to my invention any tendency of any rotor to depart from this controlling speed sets the corresponding pilot motor into operation to correct for this tendency. If, for example, an increase in load on one element of the machine tends to slow down its driving motor 3, the rotor 20 corresponding to this element of the machine will tend to fall behind the magnetic field produced in the corresponding stator 21 and produce a slight angular variation in the position of the rotor with respect to stator. If the stator structure 21 were held rigidly in place the machine comprising this stator and rotor would tend to operate as a synchronous motor taking power from the mains 30, 31 and 32 and supplying a driving torque to assist the motor 3. According to my invention, however, this torque never exceeds a negligible amount since the stators 21 are not fixed but rotatable. The stator 21 of the machine under consideration merely begins to move backwardly in an attempt to keep the magnetic poles in the stator in the fixed space relationship with the poles in the rotor. Whenever this backward rotation of the stator exceeds the predetermined slight amount necessary to cause engagement between contacts 40 and 42, the pilot motor 45 is set into operation to cut resistance 16 into the field circuit of the motor 3, which is tending to fall below the required speed until this tendency of the motor to change its speed is corrected. As soon as this tendency of the motor to change its speed is corrected, the spring 35 restores stator 21 to its normal position thus separating contact 40 from contact 42 bringing the pilot motor to a stop. When one of the motors 3 tends to exceed its normal speed of operation the corresponding rotor 20 drags its stator 21 around with it causing the contact 40 to engage contact 41 so that the pilot motor 45 is operated to cut resistance 16 out of the field circuit of the motor 3 to correct this tendency of the motor to change its speed and restore the fixed speed relationship of the elements of the machine. It will be observed that the power required to be transmitted by the belt 25 is small since no more torque is ever developed between the rotor 20 and stator 21 than is necessary to rotate the stator 21 through a very small angle against the tension of one of the springs 35 or 36. The cone pulleys 23 and 24 and belt 25 can therefore be made small and light and the regulating machines may be of small capacity. By using a gearing 22 which causes rotor 20 to turn at a considerably higher speed than the shaft of the driven element of the machine, a very small angular departure of this shaft from its true angular position can be made to produce a greatly amplified effect on the rotor 20. By constructing the synchronous regulating machine as a multipolar machine the sensitiveness of the regulation may be still further increased since the regulating machine will then develop its full regulating torque with a small angular variation in mechanical degrees.

If at any time during the normal operation of the machine it is desired to increase the speed at which the whole machine is running, the generator 33 will be speeded up to increase the frequency in mains 30, 31 and 32. Any tendency of this frequency to increase will set the regulating devices into operation to weaken the fields of all the driving motors to speed up the rotors 20 to keep them in step with the generator 33. The speed of the machine may therefore be readily adjusted. No great variation in speed will be attempted by field regulation alone, however, since it is preferable to secure such variations by a simultaneous change in the voltage of the generator 6 which supplies power to the motors 3. This voltage may be varied by adjusting the resistance 10, as is well known in the art.

It frequently happens that during the operation of a paper machine, it is necessary to adjust the draw between sections of the machine. This requires that the fixed speed relationship of the sections be adjustable. To accomplish this adjustment between any two sections it is merely necessary to adjust the position of the corresponding belt 25 along the cone pulleys 23 and 24. It will be apparent that the adjustment of the belt will make a different speed of the machine element correspond to a given speed of the rotor 20 driven from that element.

If it be desired to start the machine from rest the switches 28 may be left open until the machine elements have been brought approximately to the desired speed. The motors 3 may be started individually by the rheostats 11 or, if desired, these motors may be brought up to speed simultaneously by first cutting out the resistances 11 and then gradually bringing up the voltage of generator 6 by adjusting the strength of the current in the field winding 7 in accordance with the well known Ward-Leonard method of control. Switches 29 will be closed during this operation of bringing the motors up to speed, and the rotors 20 will induce eddy currents in the structure of the stators 21 to drag them around and close contacts 40 and 41 which will set the pilot motors into operation to strengthen the fields of the driving motors 3, thus giving a strong starting torque. When the motors have reached substantially the desired speed the switches 28 may be closed without exercising any care to synchronize the respective machines with generator 33 since the torque required to move the stator is so small that the machines will readily get into step.

While I have shown and described a polyphase generator 33 and polyphase regulating dynamo electric machines, it will be obvious to those skilled in the art that single phase may be used if desired.

While I have shown and described one embodiment of my invention, it is obvious that many variations and modifications may be made within the scope of my invention and I aim to cover all such variations and modifications in the appended claims.

What I claim as new and desire to secure by Letters Patent of the United States, is,—

1. In an electric drive wherein a plurality of elements are required to run in fixed speed relationship and wherein a motor is arranged to drive each of a plurality of said elements, the combination of means for controlling the speed of each of a plurality of said motors and means for controlling each of said speed controlling means to maintain the speed relationship of the motors fixed comprising a member driven by the corresponding motor and a cooperating independently rotatable member, one of said members being arranged to provide magnetic poles of a fixed polarity and the other member being provided with a winding adapted to be connected to an alternating current source, and a common source of alternating current for supplying said alternating current windings.

2. In an electric drive wherein a plurality of elements are required to run in fixed speed relationship and wherein a motor is arranged to drive each of a plurality of said elements, the combination of means for controlling the speed of each of a plurality of said motors and means for controlling each of said speed controlling means to maintain the speed relationship of the motors fixed consisting of a dynamo electric machine having both members movable, one being driven by the corresponding motor, a winding on one of said members adapted to be connected to a source of direct current, a winding on the other one of said members arranged to be connected to a source of alternating current, a source of direct current for supplying each of said direct current windings, and a common source of alternating current for supplying said alternating current windings.

3. In an electric drive wherein a plurality of elements are required to run in fixed speed relationship and wherein a motor is arranged to drive each of a plurality of said elements, the combination of means for controlling the speed of each of a plurality of said motors and means for controlling each of said speed controlling means to maintain the speed relationship of the motors fixed consisting of a dynamo electric machine having both members movable, one of said members being driven by the corresponding motor and being provided with a winding adapted to be connected to a source of direct current, the other one of said members being provided with a winding adapted to be connected to a source of alternating current, a source of direct current for supplying each of said direct current windings, and a common source of alternating current for supplying said alternating current windings.

4. In an electric drive wherein a plurality of elements are required to run in fixed speed relationship and wherein a motor is arranged to drive each of a plurality of said elements, the combination of means for controlling the speed of each of a plurality of said motors, means for controlling each of said speed controlling means to maintain the speed relationship of the motors fixed consisting of a member driven by the corresponding motor and an independently movable member, one of said members being arranged to provide magnetic poles of a fixed polarity, and the other member being provided with a winding adapted to be connected to an alternating current source, a common source of alternating current for supplying each of said windings, and means for maintaining one of said members in a predetermined position when no torque is produced between said members.

5. In an electric drive wherein a plurality of elements are required to run in fixed speed relationship and wherein a motor is arranged to drive each of a plurality of said elements, the combination of means for controlling the speed of each of a plurality of said motors and means for controlling each of said speed controlling means to maintain the speed relationship of the motors fixed consisting of a dynamo electric machine having its armature and field members movable, said field member being driven by the corresponding motor and being provided with a winding adapted to be connected to a source of direct current, said armature member being provided with a winding adapted to be connected to a source of alternating current, a source of direct current for supplying each of said direct current windings, a common source of alternating current for supplying said alternating current windings and means for maintaining the armature members of each machine in a predetermined position when no torque is produced between such armature member and the corresponding field member.

6. In an electric drive wherein a plurality of elements are required to run in fixed speed relationship and wherein an electric motor having a field winding is arranged to drive each of a plurality of said elements, the combination of means for controlling the speed of each of a plurality of said motors comprising a resistance in the circuit of the field winding of the motor, a pilot motor arranged to adjust said resistance and circuits for said motor, and means for controlling the operation of each of said pilot motors comprising a member driven by the corresponding driving motor and an independently rotatable member, one of said members being arranged to provide magnetic poles of a fixed polarity and the other member being provided with a winding adapted to be connected to an alternating current source, and means controlled by said independently rotatable member for completing the circuits of the pilot motor and a common source of alternating current for supplying said alternating current windings.

7. In an electric drive wherein a plurality of elements are required to run in fixed speed relationship and wherein an electric motor having a field winding is arranged to drive each of a plurality of said elements, the combination of means for controlling the speed of each of a plurality of said motors, a resistance in the circuit of the field winding of the motor, a pilot motor arranged to adjust said resistance and circuits for said motor, means for controlling the operation of each of said pilot motors comprising a member driven by the corresponding driving motor, a movable member arranged to rotate in either direction around said rotor, and means for maintaining said movable member in a predetermined position when no torque is produced between said members, one of said members being arranged to provide magnetic poles of a fixed polarity and the other member being provided with a winding adapted to be connected to an alternating current source, and means controlled by said movable member and arranged to complete one of said pilot motor circuits when said member is moved in one direction whereby the pilot motor operates to decrease the resistance in the driving motor field circuit and to complete another one of said pilot motor circuits when said member is moved in the other direction whereby the pilot motor operates to increase the resistance in the driving motor field circuit, and a common source of alternating current for supplying alternating current to said alternating current windings.

8. In an electric drive wherein a plurality of elements are required to run in fixed speed relationship and wherein a motor is arranged to drive each of a plurality of said elements, the combination of means for controlling the speed of each of a plurality of said motors, means for controlling each of said speed controlling means to maintain the speed relationship of the motors fixed consisting of a dynamo electric machine of the synchronously running type having both members movable, one being driven by the corresponding motor, one of said members being provided with a winding arranged to be connected to a source of alternating current and a common source of alternating current for supplying said alternating current windings.

9. An electric drive wherein a plurality of elements are required to run in fixed speed relationship and wherein a motor is arranged to drive each of a plurality of said elements, characterized by the fact that means are provided for controlling the speed of each of a plurality of said motors comprising a dynamo electric machine having both members movable, one member being driven by the corresponding motor, one of said members being provided with a winding arranged to be connected to a source of alternating current and a common source of alternating current for supplying said alternating current windings, said dynamo electric machine being constructed so that the speed of rotation tends to maintain a fixed relationship to the frequency of the alternating current supplied to the machine.

In witness whereof, I have hereunto set my hand this 25th day of February, 1921.

CHARLES W. SHAIFER.